July 2, 1968  R. W. KURTZ  3,390,890

PUSH-JOINT AND GASKET FOR CAST PIPE

Filed Sept. 16, 1966

United States Patent Office 3,390,890
Patented July 2, 1968

3,390,890
PUSH-JOINT AND GASKET FOR CAST PIPE
Ralph W. Kurtz, Coshocton, Ohio, assignor to Clow Corporation, a corporation of Delaware
Filed Sept. 16, 1966, Ser. No. 579,972
6 Claims. (Cl. 277—205)

ABSTRACT OF THE DISCLOSURE

A telescopic pipe joint in which a radially sealing gasket is compressed into self-contained recesses and adjacent pockets when the joint is forced axially together.

---

This invention relates to one of the simplest ways of joining a plurality of pipes water-tightly. The male-end or spigot of one pipe is simply pushed axially through a relatively tight-fitting annular seal or gasket mounted in the sleeve-end or bell of another pipe. More particularly, this invention relates to push-joints for cast iron piping; which is to say, pipe and pipe-fittings that deviate considerably from target dimensions and are generally used for constructing underground water-mains.

The earthen bed helps to keep the push-joints from separating and also imposes a heavy, often varying, load on the pipes. The bed may be unevenly made up and the vicinity may be disturbed by a changing water-table or by excavations; so it is advisable to employ joints that can be flexed and seals that are well supported in all directions, or quite moderately stressed.

In view of the roughness, or possible roughness, of cast surfaces, and the ever-present hazard of water-seeking roots, the seal should exert a somewhat greater radial pressure than ordinarily needed to produce a tight joint. The V-lipped, water-trapping or "hydromatic" type of seal, such as that shown by Pierce U.S. Patent No. 1,945,-293, is very easily engaged and much prized for portable irrigation pipelines, but is not strong enough for cast pipe joints in underground service.

While these V-lipped seals can be reinforced and mounted as shown by Altemus U.S. Patent No. 2,871,031, the ability to accommodate large deviations in pipe diameters is sacrificed along with the very low resistance to spigot insertion. Capacity is regained by simply increasing the cross-sectional size of the seal, but this is not the most economical recourse.

Relatively cheap O-ring type seals have been used to a limited extent, in push-jointing cast pipe, and answer fairly well if the spigot is provided with a well-beveled or non-shearing nose, as can be done when the pipe is being cast. Many pipes are cut at the trench site, however, to suit the location of valves and fittings; so the user is best served by a seal or gasket that will accommodate blunt-end as well as beveled-end spigots.

Such a gasket is shown in this applicant's U.S. Patent No. 2,898,131 and can be described as a pull-on seal, inasmuch as the sealing section is pulled onto the spigot by supplementary flange-and-groove means. The jamming and shearing action had with solid push-on seals is eliminated, and the need for a beveled spigot is decreased at the cost of a pulling flange and anchoring groove, a matter that gains importance from the great number of joints being produced.

Apart from cost, the flange adds an element of risk since it can be mismeshed with the anchoring groove quite easily and result in improper compression. The fault cannot be observed and is apt to result in a leak when the joint is tested later. Lacking access to the gasket then, the pipelayer must decide whether to disassemble the pipeline for repair or to apply a costly device known as a "leak-clamp" to the defective joint.

To overcome these shortcomings, the present invention provides a unique recessed gasket which cannot be misengaged or dislodged in a properly related push-on bell. The cost of a flange and anchoring groove is eliminated, but the advantages of a pull-on seal are nevertheless retained by the new construction.

Figure 1:
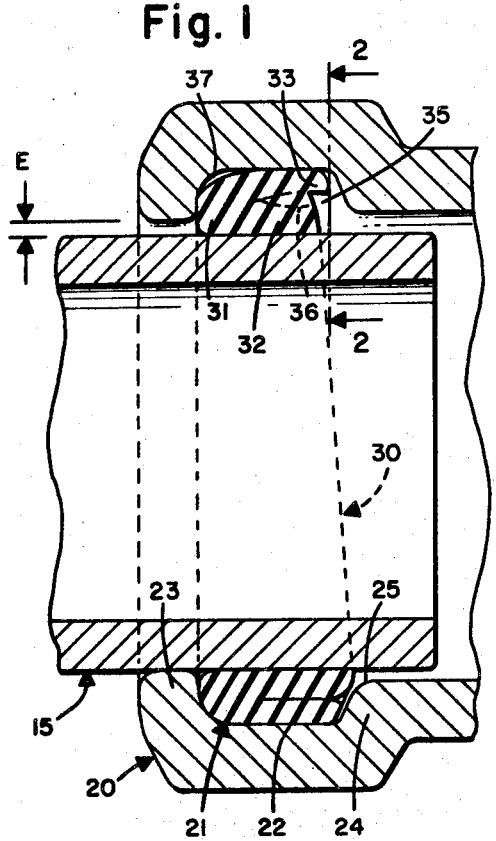
FIG. 1 is a longitudinal sectional view taken through an assembled pipe joint which embodies the present invention.

Referring first to FIG. 1, it will be noted that the joint comprises an ordinary cylindrical spigot 15 and a bell or coupling sleeve 20 which cooperate in compressing the new gasket 30 radially therebetween. The bell and spigot constitute the end portions of pipes or fittings that are normally cast from iron and used in the as-cast, cleaned but unmachined, condition. The gasket 30 is constructed preferably from rubber, sometimes two varieties (hardnesses) of rubber, but may be produced from other, suitable elastomeric materials.

The spigot 15 is formed the same as for a flanged pull-seal joint, and is forced home by the same means, a common crowbar in the case of pipe ten inches and less in diameter. The end or nose of the spigot is preferably beveled, as shown at 16 in FIG. 3, but many also be quite blunt as indicated in FIG. 4. If cut on-the-job, the stub end of the spigot should be dulled, but need not be chamfered or well rounded.

The bell 20 is provided internally with a coaxial annular channel or cylindrical packing groove 21 which must be large enough to accommodate the entire solid bulk of the gasket 30 and can be somewhat overly broad as indicated in the lower part of FIG. 1. The groove 21 is defined by a substantially constant diameter bearing surface or radial seat 22, an annular outer step or lip 23, and an annular inner end wall or ledge 24.

The lip 23 has radially supporting relation with the spigot 15 and for this purpose has an inside diameter only slightly larger than the outside diameter of the largest spigot used in the joint. The ledge 24, on the other hand, defines an axial passage whose diameter is conveniently greater than the inside diameter of the lip 23, but much smaller than the outside diameter of the gasket 30 and too small for the gasket to be misseated therein. The rounded outside corner 25 prevents the gasket 30 from hanging on the edge of the ledge, even though the installer uses gloved hands and cannot judge the action well.

The ledge 24 meets the seat 22 at a slightly obtuse angle which is convenient in casting and is tolerable from a gasket holding standpoint. The lip 23 has a flat bearing face or curb for the gasket 30 and a relatively large flared base surface that cooperates with the seat 22 in providing a coved, easily cleaned groove. The proper radial extent of the lip is related to the gasket stress and will be discussed later in connection with the casting tolerances.

Figure 3:
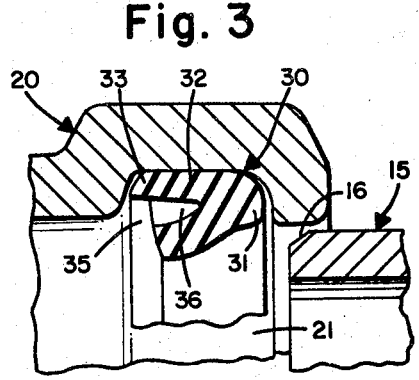
FIG. 3 is a fragmentary, longitudinal sectional view of the pipe joint showing the gasket prior to the insertion of the spigot.
Figure 4:
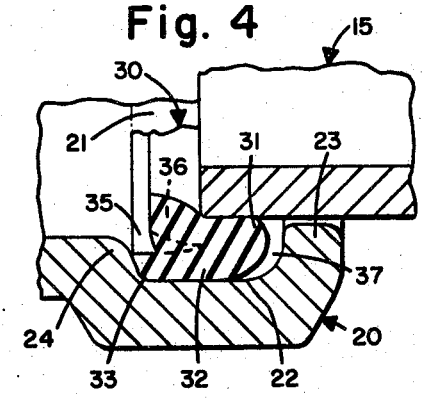
FIG. 4 is a view similar to FIG. 3, but illustrating the behavior of the gasket under the pushing action of a blunt-nosed spigot.

As best shown in FIG. 3, the gasket 30 has three distinct, yet adjoining and peripherally aligned, axial parts or sections, namely: an entrance or bracing section 31 disposed adjacent to the lip 23, an intermediate or sealing section 32 which slants into the path of the spigot 15, and a relatively thinner, spacing section or rim 33 which defines a short annular niche or pocket 35 adjacent to the ledge 24.

The spacing rim 33 is particularly significant since it engages the ledge 24 and serves somewhat like the flange of a pull-on seal by holding the sealing section 32 radially outwardly only and inwardly free to distend, when the spigot is pushed therethrough. For best action then, the rim 33 should be little more than thick enough radially to resist buckling; and little more than broad enough axially to prevent the sealing section 32 from overrunning or being pinched against the ledge 24 which may have twice the radial extent of the rim 33.

In relaxed state, the radially and axially inner faces of the sealing section 32 meet at a substantially 90-degree angle well short of the ledge 24, from which point the axially inner or end face extends radially outwardly and slightly axially inwardly to the rim 33. Viewed transversely, the radially inner or internal face defines a reverse curve of shallow S-shaped configuration which flares progressively outwardly and smoothly joins the radially inner face of the entrance section 31.

A large part of the sealing section 32 projects radially into the path of the spigot, or the axially projected entrance opening of the bell, and would be difficult to compress into the groove 21 were it not for a multiplicity of recesses 36 which extend axially outwardly into the jutting inner end or shoulder of the section 32 at uniform circumferential intervals. While the resistance to compression might be reduced by decreasing the hardness of the gasket, this recourse is not as economical as the one employed and leads to no better seal, especially not when water under pressure is applied to the recesses in practice.

Production of the recesses 36 is easily accomplished by means of a multifid coring element mounted in the gasket mold. During the gasket curing operation, the coring element conducts heat into the center of the relatively thick sealing section 32; and when the mold is opened, the coring element serves to extract the hot gasket. The production rate is accordingly high and about 20% higher than generally attained for flanged pull-on seals of equal weight.

Figure 5:
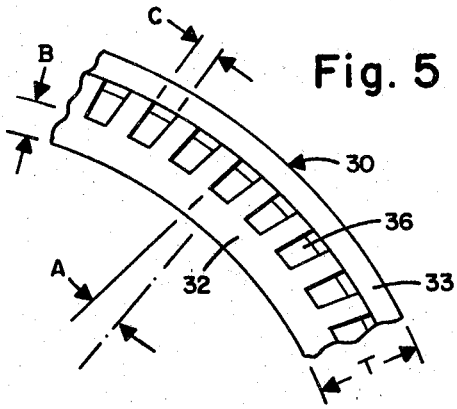
FIG. 5 is a fragmentary elevational view of the nominally-inner end of the gasket in its natural relaxed condition, shown on somewhat enlarged scale.

As shown in FIGS. 3 and 5, the recesses 36 are defined by radially spaced annular walls which merge axially outwardly, well within the sealing section 32, and by interposed cross-bracing walls which have side faces disposed in possibly oblique relation with the surrounding annular walls. The angle A included by these side faces and a true radial line, may vary from nil to 15 degrees and is preferably about 8 degrees.

In order to assure a strong sealing pressure radially inwardly from the recesses 36, the inner annular or interior wall has a thickness B that is preferably about 35% greater than the recess width C. The outer annular or exterior wall, being arched against the seat 22 of the bell, has a thickness only about 10% greater tha nthe width C. The cross walls are proportioned to resist buckling under radial pressure, and for this purpose, have a thickness about 65% as great as the greatest radial extent thereof.

Maximum recess volume is achieved, under the terms, by equating the thickness of the cross walls and the width C, which then becomes the quotient had from dividing the full thickness T of the gasket by the sum of 1.35 plus 1.10 plus 100/65, or 4.0 approximately. If the gasket thickness T were 1.00 inch, the recess width and cross wall thickness would thus be about 0.25 inch. The thickness B of the inner annular wall would be about 0.34 inch and about 0.06 inch greater than the outer annular wall.

These proportions result in a recess volume which is substantially less than that needed to absorb all of the elastomeric gasket structure which could be pressed theretoward when a spigot is being accommodated. A large part of the stressed structure would be crowded and bulged into the adjoining pocket 35. The conditions permit the recesses to be varied considerably in both size and shape; but in view of the need for a strong seal and good economy, the total volume of the recesses is best held to an amount less than 60% and more than 30% as great as the volume of gasket structure disposed axially and radially inwardly from the lip 23 of the bell in interfering or displaceable relation with, the spigot.

In constructing a water-main, the pipe is best gasketed above ground and installed "bell ahead." The gasket is soaped to reduce friction and the spigot is laid in the lip 23 of the bell ahead, where it does not become centered until some considerable endwise pressure is applied. Then, as shown in FIG. 4, a portion of the gasket sealing section 32 is turned or plowed out of the path of the spigot into the waiting pocket 35. Coincidentally, the entrance section 31 is turned or rocked inwardly against the spigot and keeps the section 32 from being tumbled completely out of the seat 22.

Figure 2:
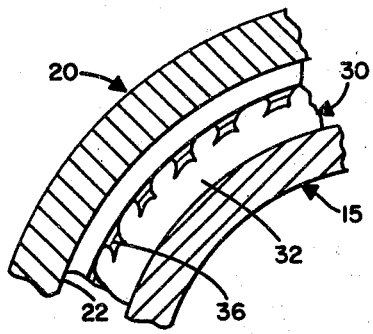
FIG. 2 is a fragmentary, transverse sectional view taken along line 2—2 of FIG. 1.

As illustrated in FIGS. 1 and 2, the elastomeric walls which surround the recesses 36 are bulged therein by the pushing and plowing pressure. The annular walls are compressed circumferentially, in response to the thrust of the cross walls, and are rotated slightly aside if these thrusting walls are slanted from a true radial direction. The inner annular wall is distended axially at the same time and relieved of some compressive stress in the pocket 35.

The recesses 36 are reduced as much as 80% in volume and a gap or pocket 37 is opened or enlarged, between the entrance section 31 and the lip 23 of the bell; then partly or wholly back-filled as the elastomeric gasket is extensively reduced in thickness and incidentally increased in breadth. As the inward pressure is brought to an end, the sealing section 32 distends axially outwardly more freely and engages a broader area of the seat 22.

Finally, under operating internal fluid pressures, the gasket is driven, sometimes water-hammered, axially outwardly against the lip 23, as shown in FIG. 1, and further tightened. Negative pressures, sometimes had when an underground pipeline is drained, are not generally great enough to reverse the axial position of the gasket 30, when properly mounted, much less break the seal provided by the cross-walled section 32.

It will be understood that push-joints, lacking takeup means, cannot be brought to a uniform degree of tightness. The gaskets can and should be radially compressed in a safe range, however; to no less than about 90% of the full thickness T and to no more than about 60% of this thickness. The gasket should not project into the path of the spigot a distance greater than 40% of the thickness T, and for this result, the diameter of the seat 22 is taken as the inside diameter of the lip 23 increased by 120% of the thickness T.

The metallurgical conditions which affect the diameter of a cast metal bell 20 and the fit of the spigot 15 therein, have relatively little influence on the depth of the groove 21. The seat 22 and the lip 23 normally vary in concert. The gasket 30 is proportioned to fit snugly in an oversized bell and be circumferentially squeezed into an undersized bell, so that the amount of gasket structure disposed in the path of the spigot remains practically constant for a given pipe size.

The minimum degree of radial compression occurs when, and if, a spigot that is barely over minimum diametric limits happens to be mated with a bell that is barely under maximum diametric limits; not at once, but after the undersized spigot is worked to one side of the oversized bell by persistent underground forces. A maximum and minimum degree of compression is realized simultaneously then, at diametrically opposite points, and the arithmetical difference in compression relates to 100% as the side play of the spigot must relate to the gasket thickness T.

More specifically, if the dimension E (FIG. 1) should be as great as 0.36 inch, as is possible with customary tolerances for 20-inch cast iron pipe, the gasket thickness T would then have to be 100/30 times as great as 0.36 inch, or 1.20 inch, and about 20% greater than generally used in push-jointing cast pipe. The sealing section 32 would extend into the path of the spigot 0.48 inch, a distance about 33% greater than the side play and about 67% as great as the radial extent of the lip 23.

As indicated in FIG. 3, the radially inner and outer surfaces of the sealing section 32 have substantially equal areas, and breadths about 90% as great as the thickness T, when relaxed. The reversely curved inner surface slants axially inwardly toward its axis at an angle which decreases from about 30 degrees to an angle of 10 degrees or less, in order to secure a broad axial contact with the spigot when the sealing section 32 is only slightly compressed.

The entrance section 31 of the gasket might be described as an annular stabilizing shoulder which fits against the lip 23 of the bell, and is otherwise proportioned to serve two purposes. First, in order to ease a blunt-end spigot into the sealing section 32, the internal face defines a smooth passage from the lip 23 of the bell. Secondly, in order to resist extrusion of the gasket in response to possible water-hammer, the axial breadth is somewhat greater than the width E of the maximum possible gap or egress between the lip 23 and the spigot 15.

In the case of small diameter pipe and accordingly small lip-to-spigot gaps, a suitable gasket 30 is constructed from a single grade of rubber, preferably in the durometer hardness range of from 60A to 70A. In the case of pipe cast larger than about 12 inches in diameter, the entrance section 31 is preferably formed from a stiffer, less extrudable, grade of rubber than the remaining sections 32 and 33 of the gasket. For example, the entrance section 31 could be composed of a rubber of approximately 85A durometer hardness, while the balance of the gasket would have a durometer hardness ranging from 55A to 65A.

Being recessed at frequent intervals, and to that extent articulated, the gasket 30 is easily folded and unfolded or "wormed" into the deep groove 21 of the bell, despite a stiffened entrance section and unusual thickness. The seat 22 of the groove should be clean, but need not be dry, since the rim 33 of the gasket is tightened radially as well as axially by the push-on action. The spigot can meet the entrance section 31 at an angle of six or seven degrees without danger of dislodging the gasket from a seat 22 that has been moistened or even greased.

As has been noted, the spigot can have a blunt nose without endangering the gasket 30. The force required to push the spigot home is considerably reduced, however, if its nose is beveled or otherwise streamlined to some extent. If beveled, the axial extent is best limited to about 20% of the gasket breadth, in view of the small benefit to be derived from a greater bevel and the possibly weakening effect on a cast spigot.

While not illustrated, it will be obvious that the spigot 15 can be canted or angled in the bell 20. The lip 23 of the bell serves as a fulcrum, in this case, and the ledge 24 may act as a flexural limit. One side of the gasket 30 is relaxed, while the opposite side is further compressed and the action is registered by minor changes in the recesses 36 and the pockets 35, 37.

Being extensively recessed, the gasket 30 is not forced to distend wholly axially, under radial pressure, and the maximum fiber stress is less than would obtain if the sealing section 32 were solidly constructed. The chance of slow plastic deformation of the section, or loss of resiliency, is accordingly less, and the ability of the joint to withstand future disturbance is greater; particularly so, when the maximum compression is limited to the extent advocated herein.

I claim:
1. In a telescopic pipe joint construction comprising a cylindrical spigot and a sleeve-like bell which are apt to deviate considerably from optimum design dimensions, said bell having an annular lip and an annular ledge projecting radially inwardly at respectively opposite ends of an axially extending circumferential bearing surface and therewith defining an uninterrupted axially elongated annular groove, said lip providing an axial entrance opening only slightly greater in diameter than the largest tolerated spigot and said ledge providing an inner opening at least as large as said entrance opening: that improvement which comprises an annular elastomeric gasket conformed to and seated on the bearing surface of said groove, said gasket being axially narrower than said groove and including three axially adjoining, integrated sections; namely, a solid entrance section conformed to and disposed adjacent the lip of said bell for stabilizing and bracing said gasket, said entrance section having a radially inner surface sized substantially the same diametrically as the entrance opening of said bell, an intermediate sealing section having an inner surface extending axially and gradually radially inwardly from the inner surface of said entrance section into interfering relationship with the smallest tolerated spigot and defining a resiliently displaceable portion of gasket structure lying in the axially projected entrance opening of said bell, said sealing section being formed with a radially extending end face and a series of circumferentially spaced recesses extending from said end face axially toward said entrance section, said recesses having collectively less volume than said displaceable portion, and a spacing section projecting axially inwardly from said sealing section toward the ledge of said bell, said spacing section having an inside diameter greater than the entrance opening of said bell and defining with the end face of said sealing section an annular corner pocket to receive a part of said displaceable portion when displaced by the spigot of said joint.

2. A pipe joint as described in claim 1, wherein the inner surface of said sealing section defines a reversed curve in extending inwardly from said entrance section.

3. A pipe joint as described in claim 1, wherein said series of circumferentially spaced recesses is disposed in closer proximity to the bearing surface of said groove than to the inner surface of said sealing section.

4. A pipe joint as described in claim 1, wherein the recesses of said sealing section are defined by radially spaced annular walls which converge toward the entrance section of said gasket and by interposed cross walls of generally rectangular transverse form.

5. A pipe joint as described in claim 4, wherein the width dimensions of said recesses are less than the thickness dimensions of said annular walls.

6. A pipe joint as described in claim 4, wherein said cross walls define oblique angles with said annular walls.

References Cited

UNITED STATES PATENTS

| | | |
|---|---|---|
| 1,802,177 | 4/1931 | Knight. |
| 1,899,695 | 2/1933 | Johnson. |
| 2,871,031 | 1/1959 | Altemus. |
| 2,953,398 | 9/1960 | Haugen et al. |

LAVERNE D. GEIGER, *Primary Examiner.*

J. S. MEDNICK, *Assistant Examiner.*